United States Patent
Okamatsu

(10) Patent No.: US 9,732,203 B2
(45) Date of Patent: Aug. 15, 2017

(54) EMULSION COAGULANT, AND FLAT TIRE REPAIR KIT USING SAME

(71) Applicant: THE YOKOHAMA RUBBER CO., LTD., Minato-Ku, Tokyo (JP)

(72) Inventor: Takahiro Okamatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 245 days.

(21) Appl. No.: 14/434,246

(22) PCT Filed: Oct. 8, 2013

(86) PCT No.: PCT/JP2013/077349
§ 371 (c)(1),
(2) Date: Apr. 8, 2015

(87) PCT Pub. No.: WO2014/057937
PCT Pub. Date: Apr. 17, 2014

(65) Prior Publication Data
US 2015/0291775 A1    Oct. 15, 2015

(30) Foreign Application Priority Data

Oct. 9, 2012  (JP) ................................ 2012-224099

(51) Int. Cl.
| | |
|---|---|
| *B29C 73/16* | (2006.01) |
| *C08K 5/5425* | (2006.01) |
| *C08K 3/22* | (2006.01) |
| *C08K 5/5415* | (2006.01) |
| *C08L 1/02* | (2006.01) |
| *C08L 1/28* | (2006.01) |
| *C09K 3/10* | (2006.01) |
| *C08L 21/00* | (2006.01) |

(52) U.S. Cl.
CPC .......... *C08K 5/5425* (2013.01); *B29C 73/163* (2013.01); *C08K 3/22* (2013.01); *C08K 5/5415* (2013.01); *C08L 1/02* (2013.01); *C08L 1/286* (2013.01); *C09K 3/1015* (2013.01); *C08K 2003/222* (2013.01); *C08K 2003/2224* (2013.01); *C08L 21/00* (2013.01)

(58) Field of Classification Search
CPC ............................ C08K 3/2217; B29C 73/163
USPC ....................................................... 523/166
See application file for complete search history.

(56) References Cited

U.S. PATENT DOCUMENTS

| | | |
|---|---|---|
| 7,745,511 B2 | 6/2010 | Okamatsu et al. |
| 8,791,175 B2 | 7/2014 | Okamatsu et al. |
| 9,115,285 B2 * | 8/2015 | Chevalier ............. C09C 1/0093 |

FOREIGN PATENT DOCUMENTS

| | | |
|---|---|---|
| JP | 4245654 B2 | 3/2009 |
| JP | 2011-246610 A | 12/2011 |

* cited by examiner

*Primary Examiner* — Edward Cain
(74) *Attorney, Agent, or Firm* — Carrier Blackman & Associates, P.C.; Joseph P. Carrier; Anne G. Sabourin

(57) ABSTRACT

An object of the present invention is to provide a novel emulsion coagulant having excellent coagulability used in a tire puncture sealing agent, and a tire puncture repair kit that uses the same. The present invention is an emulsion coagulant comprising magnesium oxide and a silane coupling agent and a cellulose and/or magnesium hydroxide, wherein a mass ratio of the magnesium oxide to the silane coupling agent is from 100:0.5 to 100:15; and a tire puncture repair kit that uses the same.

4 Claims, No Drawings

EMULSION COAGULANT, AND FLAT TIRE REPAIR KIT USING SAME

TECHNICAL FIELD

The present invention relates to an emulsion coagulant and a tire puncture repair kit using the same.

BACKGROUND

Conventionally, a coagulant has been used to recover puncture repair material after a tire puncture has been repaired using a tire puncture repair material (tire puncture sealing agent).

As coagulants, the present inventors have thus far proposed a liquid coagulant which coagulates an emulsion containing natural rubber latex, the liquid coagulant containing a urethane resin and/or acrylic resin having a cationic functional group and having a pH from 2.0 to 4.0 (Patent Document 1), and an emulsion coagulant for coagulating a tire puncture sealing material containing emulsion particles, the emulsion coagulant containing a mineral that induces aggregation of the emulsion particles by weakening a surface charge of the emulsion particles and/or by hydrogen bonding with the emulsion particles, and a gelling agent (Patent Document 2).

PRIOR ART DOCUMENT

Patent Document

Patent Document 1: Japanese Unexamined Patent Application Publication No. 2011-246610A
Patent Document 2: Japanese Patent No. 4245654

SUMMARY OF THE INVENTION

Problem to be Solved by the Invention

However, when an antifreeze agent is contained in a tire puncture sealing agent, there is room for improvement in the coagulability of conventional coagulants.

Furthermore, the present inventors thought it necessary to have an emulsion coagulant that can effectively coagulate a tire puncture sealing agent by a mechanism different from that of conventional coagulants, regardless of whether or not an antifreeze agent is contained in the tire puncture sealing agent.

An object of the present invention is to provide a novel emulsion coagulant having excellent coagulability used in a tire puncture sealing agent, and a tire puncture repair kit that uses the same.

Means to Solve the Problem

As a result of diligent research to solve the above problems, the present inventors used magnesium oxide and a silane coupling agent, which differ from the coagulation components used in conventional coagulants, and discovered that a combination of magnesium oxide and a silane coupling agent and a cellulose and/or magnesium hydroxide has an excellent effect (coagulability) as a coagulant of a tire puncture sealing agent, and they thereby achieved the present invention.

Furthermore, because the present invention uses a combination of materials that differs from coagulants seen thus far, its mechanism also differs from that of conventional coagulants. In short, it is thought that in this combination, the magnesium oxide and the cellulose or magnesium hydroxide form a network (crosslinked structure) via the silane coupling agent, causing the tire puncture sealing agent (puncture repair liquid) to gel.

Additionally, the present invention can effectively coagulate a tire puncture sealing agent regardless of whether or not the tire puncture sealing agent contains an antifreeze agent.

Specifically, the present invention provides the following 1 to 5.

1. An emulsion coagulant containing magnesium oxide and a silane coupling agent and a cellulose and/or magnesium hydroxide, wherein the mass ratio of the magnesium oxide to the silane coupling agent is from 100:0.5 to 100:15.
2. The emulsion coagulant according to 1 above, wherein the silane coupling agent is at least one type selected from the group consisting of a compound having a methacryloxy group and at least one type selected from the group consisting of a dimethoxysilyl group, a trimethoxysilyl group, a diethoxysilyl group, and a triethoxysilyl group, tetramethoxysilane, and tetraethoxysilane.
3. The emulsion coagulant according to 1 or 2 above, wherein the mass ratio of the magnesium oxide to the cellulose and/or magnesium hydroxide is from 100:40 to 100:400.
4. The emulsion coagulant according to any one of 1 to 3 above, wherein the magnesium oxide and the silane coupling agent and the cellulose and/or magnesium hydroxide are packaged in a batch.
5. A tire puncture repair kit having the emulsion coagulant described in any one of 1 to 4 above and a tire puncture sealing agent.

Effect of the Invention

The emulsion coagulant of the present invention and the tire puncture repair kit of the present invention have excellent coagulability of a tire puncture sealing agent.

BEST MODE FOR CARRYING OUT THE INVENTION

The present invention is described in detail below.

The emulsion coagulant of the present invention is an emulsion coagulant containing magnesium oxide and a silane coupling agent and a cellulose and/or magnesium hydroxide, wherein the mass ratio of the magnesium oxide to the silane coupling agent is from 100:0.5 to 100:15.

The magnesium oxide contained in the emulsion coagulant of the present invention is not particularly limited. Examples thereof include conventionally known products.

Examples of the silane coupling agent contained in the emulsion coagulant of the present invention include compounds having a hydrolyzable silyl group and a functional group other than a hydrolyzable silyl group, and tetrafunctional hydrolyzable silanes.

Examples of the hydrolyzable silyl group include an alkoxysilyl group; groups in which an aromatic hydrocarbon group and a silicon atom are bonded via an oxygen atom, such as a phenoxysilyl group; and silyl groups in which an alkoxy group and a group in which an aromatic hydrocarbon group and an oxygen atom are bonded are bonded to one silicon atom. From the perspective of obtaining superior coagulability, the hydrolyzable silyl group is preferably an alkoxysilyl group, and more preferably a methoxy group or ethoxy group.

The number of groups bonded to one silicon atom in the silane coupling agent, such as an alkoxy group and a group in which an aromatic hydrocarbon group and an oxygen atom are bonded, is from 1 to 3, and from the perspective of obtaining superior coagulability, is preferably 2 or 3. If the number of groups bonded to one silicon atom in the silane coupling agent, such as an alkoxy group and a group in which an aromatic hydrocarbon group and an oxygen atom are bonded, is 1 or 2, other groups that can be bonded to the silicon atom are not particularly limited. For example, hydrocarbons groups can be used. Examples of the hydrocarbon groups include aliphatic hydrocarbon groups such as a methyl group and an ethyl group, alicyclic hydrocarbon groups, aromatic hydrocarbon groups, and combinations thereof. The hydrocarbon group may have a hetero atom such as an oxygen atom, a nitrogen atom, or a sulfur atom. The hydrocarbon group may be a straight-chain or branched group, and may have an unsaturated bond.

Examples of the functional group other than a hydrolyzable silyl group in the silane coupling agent include a (meth)acryloyl group, a (meth)acryloxy group [(meth)acryloyloxy group], a vinyl group, and a (meth)acrylonitrile group. Among these, a (meth)acryloxy group and a vinyl group are preferred from the perspective of obtaining superior coagulability.

The constituent groups between the hydrolyzable silyl group and the functional group other than a hydrolyzable silyl group are not particularly limited. Examples include hydrocarbon groups, examples of which are aliphatic hydrocarbon groups, alicyclic hydrocarbon groups, aromatic hydrocarbon groups, and combinations thereof. The hydrocarbon group may have a hetero atom such as an oxygen atom, a nitrogen atom, or a sulfur atom. The hydrocarbon group may be a straight-chain or branched group, and may have an unsaturated bond.

The tetrafunctional hydrolyzable silane as the silane coupling agent is not particularly limited provided that it is a compound in which a total of four alkoxy groups and/or groups in which an aromatic hydrocarbon group and an oxygen atom are bonded are bonded to one silicon atom. Examples include tetraalkoxysilanes such as tetramethoxysilane and tetraethoxysilane, and aromatic tetrafunctional silanes such as tetraphenoxysilane.

From the perspective of obtaining superior coagulability, the silane coupling agent is preferably a (meth)acrylsilane [a silane coupling agent having a (meth)acryloxy group and a hydrolyzable silyl group] or a tetraalkoxysilane, more preferably a methacrylsilane or a tetraalkoxysilane, and even more preferably at least one type selected from the group consisting of a compound having a methacryloxy group and at least one type selected from the group consisting of a dimethoxysilyl group, a trimethoxysilyl group, a diethoxysilyl group, and a triethoxysilyl group, tetramethoxysilane, and tetraethoxysilane.

A single silane coupling agent can be used alone or a combination of two or more can be used. The method of manufacturing the silane coupling agent is not particularly limited. Examples thereof include conventionally known methods.

In the present invention, the mass ratio of the magnesium oxide to the silane coupling agent (magnesium oxide:silane coupling agent) is from 100:0.5 to 100:15. If this range is satisfied, coagulability is excellent. For the same reason, from the perspective of obtaining superior coagulability, the ratio of magnesium oxide:silane coupling agent is more preferably from 100:1 to 100:4, and even more preferably from 100:2 to 100:4.

The emulsion coagulant of the present invention contains a cellulose and/or magnesium hydroxide.

The magnesium hydroxide able to be contained in the emulsion coagulant of the present invention is not particularly limited. Examples thereof include conventionally known products.

From the perspective of obtaining superior coagulability and storage stability, an example of a preferable aspect, from among embodiments, is one in which the emulsion coagulant of the present invention contains a cellulose.

The cellulose able to be contained in the emulsion coagulant of the present invention is not particularly limited provided that it is a compound in which glucose molecules have polymerized into a straight chain by glycoside bonds.

Furthermore, at least some of the hydroxy groups in the cellulose may be modified by, for example, —O—R—COOX (wherein R is a hydrocarbon group, and X is a hydrogen atom, an alkali metal such as sodium or potassium, or an ammonium ion; the hydrocarbon group has the same meaning as above), hydroxyethyl, or hydroxypropyl.

Among these, unmodified cellulose, or cellulose in which at least some of the hydroxy groups in the cellulose are modified by, for example, —O—R—COOX is preferred from the perspective of obtaining superior coagulability and excellent storage stability. In the formula, the hydrocarbon group represented by R is not particularly limited. Examples of the hydrocarbon group include aliphatic hydrocarbon groups, alicyclic hydrocarbon groups, aromatic hydrocarbon groups, and combinations thereof. The hydrocarbon group may, for example, have a hetero atom such as an oxygen atom, a nitrogen atom, or a sulfur atom, may be a straight-chain or branched group, and may have an unsaturated bond. Specific examples include an alkylene group and a phenylene group.

From the perspective of obtaining superior coagulability and excellent storage stability and cost, an example of a preferable aspect is one in which waste paper cellulose, recycled waste paper, or cellulose fiber is used as cellulose.

The weight average molecular weight of the cellulose is preferably from 30,000 to 1,000,000, and more preferably from 100,000 to 600,000, from the perspective of obtaining superior coagulability and excellent storage stability and cost. The weight average molecular weight of the cellulose was determined in terms of polyethylene oxide by gel permeation chromatography (GPC) using dimethylformamide as a solvent.

Cellulose or magnesium hydroxide can be used alone, or a combination of two or more can be used. The respective methods of manufacturing cellulose and magnesium hydroxide are not particularly limited. Examples thereof include conventionally known methods.

The mass ratio of magnesium oxide to cellulose and/or magnesium hydroxide (magnesium oxide:cellulose and/or magnesium hydroxide; if cellulose and magnesium hydroxide are both contained, the total thereof) is preferably from 100:40 to 100:400, and more preferably from 100:40 to 100:350, from the perspective of obtaining superior coagulability and excellent storage stability.

The emulsion coagulant of the present invention, in addition to the above, may contain as desired when necessary, additives such as, for example, anti-aging agents, antioxidants, pigments (dyes), plasticizers, thixotropic agents, UV absorbents, flame retardants, surfactants (including leveling agents), dispersants, dehydrating agents, antistatic agents, and the like.

The method of manufacturing the emulsion coagulant of the present invention is not particularly limited. For example, the emulsion coagulant can be manufactured by uniformly mixing the magnesium oxide, the silane coupling agent, the cellulose and/or magnesium hydroxide, and the additives that may be used as necessary.

Furthermore, the emulsion coagulant may also be manufactured by premixing and reacting the magnesium oxide and the silane coupling agent and then adding the cellulose and/or magnesium hydroxide thereto. The magnesium oxide and silane coupling agent may be heated when premixed. If additives are used, they may be added at any stage.

Furthermore, the emulsion coagulant may also be manufactured by, for example, premixing and reacting the cellulose and/or magnesium hydroxide and the silane coupling agent, and then adding the magnesium oxide thereto. The cellulose and/or magnesium hydroxide and silane coupling agent may be heated when premixed. If additives are used, they may be added at any stage.

The emulsion coagulant of the present invention can be used to coagulate a tire puncture sealing agent.

The form of the emulsion coagulant of the present invention is not particularly limited. For example, an aspect in which the emulsion coagulant of the present invention has been packaged in a batch is possible. Here, packaged in a batch means that the magnesium oxide, the silane coupling agent, the cellulose and/or magnesium hydroxide, and the additives that may be used as necessary are brought together as one.

Examples of specific aspects include a one-liquid type in which all components are mixed and contained in one package, and a type with not less than two liquids, in which the components are contained separately in not less than two packages, the not less than two packages making one set.

Examples of types with not less than two liquids include a two-liquid type having a first liquid containing the magnesium oxide and the silane coupling agent, and a second liquid containing the cellulose and/or magnesium hydroxide; a two-liquid type having a first liquid containing the cellulose and/or magnesium hydroxide and the silane coupling agent, and a second liquid containing the magnesium oxide; and a three-liquid type having a first liquid containing the magnesium oxide, a second liquid containing the silane coupling agent, and a third liquid containing the cellulose and/or magnesium hydroxide. If additives are used, they may be added to any of the packages.

The method of use of the emulsion coagulant of the present invention is not particularly limited. Examples include the conventionally known methods of use described in Japanese Unexamined Patent Application Publication No. 2011-246610A, Japanese Unexamined Patent Application Publication No. 2011-143631A, and Japanese Unexamined Patent Application Publication No. 2011-143632A.

Emulsion coagulants used in coagulation of tire puncture sealing agents proposed have, for example, typically included a type that coagulates a tire puncture sealing agent by breaking up emulsion particles in the tire puncture sealing agent to produce a secondary aggregate of emulsion particles, and a type in which, when the emulsion coagulant contains a gelling agent such as cellulose, the entire mixture of emulsion coagulant and tire puncture sealing material is gelled and coagulated by a gelling agent.

However, if the emulsion coagulant contains an antifreeze agent, there is room for improvement in coagulating the tire puncture sealing agent by a gelling agent.

In contrast, the emulsion coagulant of the present invention uses a combination of magnesium oxide, a silane coupling agent, and a cellulose and/or magnesium hydroxide. The emulsion coagulant of the present invention can effectively coagulate a tire puncture sealing agent. It is thought that in the emulsion coagulant of the present invention, the magnesium oxide and the cellulose and/or magnesium hydroxide form a network (crosslinked structure) via the silane coupling agent, causing the tire puncture sealing agent to gel. Furthermore, the mechanism described above is the conjecture of the present inventors, and even if the mechanism differs from that described above, it is included in the scope of the present invention.

According to the present invention, when recovering a tire puncture sealing agent (for example, when the emulsion coagulant of the present invention is used after tire puncture sealing agent remaining inside a tire is removed from the tire, or when using the emulsion coagulant of the present invention inside a tire in which a tire puncture sealing agent was used), the tire puncture sealing agent can be coagulated quickly. After coagulation, the tire puncture sealing agent is easy to handle, because it becomes substantially solid. For this reason the tire puncture sealing agent can also be easily disposed.

From the perspective of obtaining superior coagulability of a tire puncture sealing agent, the amount of emulsion coagulant used is preferably from 5 to 50 parts by mass, and more preferably from 10 to 40 parts by mass, per 100 parts by mass of tire puncture sealing agent.

The tire puncture repair kit of the present invention will be described below.

The tire puncture repair kit of the present invention is a tire puncture repair kit having the emulsion coagulant of the present invention and a tire puncture sealing agent.

The tire puncture sealing agent of the tire puncture repair kit of the present invention is not particularly limited. Examples include those containing an emulsion (including emulsion particles). In the present invention, an emulsion (including latex) means a system in which one of two liquid phases that do not mix with each other is dispersed as fine particles in the other phase. In the present invention, an example of a preferable aspect is one in which a tire puncture sealing agent contains at least water as a dispersion medium and contains emulsion particles of rubber and/or resin as a dispersoid.

Examples of the emulsion contained in the tire puncture sealing agent include rubber latexes such as natural rubber latex or synthetic rubber latex, and synthetic resin emulsions.

The natural rubber latex used in the tire puncture sealing agent is not particularly limited.

The synthetic rubber latex is not particularly limited, and examples thereof include conventionally known products. Specific examples include latexes of synthetic rubbers such as styrene-butadiene rubber (SBR), acrylonitrile-butadiene rubber (NBR), and chloroprene rubber (CR).

The synthetic resin emulsion used in the tire puncture sealing agent is not particularly limited, and examples thereof include conventionally known products. Examples of the synthetic resin emulsion include emulsions of synthetic resins such as urethane resins, (meth)acrylic resins, polyolefin resins, ethylene vinyl acetate-based copolymers (in addition to ethylene vinyl acetate copolymers, the ethylene vinyl acetate-based copolymers include, for example, ethylene vinyl acetate vinyl versatate copolymers), polyvinyl acetate, and polyvinyl chloride.

Examples of the emulsion particles contained in the tire puncture sealing agent include rubber latex particles and synthetic resin emulsion particles.

The rubber latex particles used as the emulsion particles in the tire puncture sealing agent are not particularly limited, and examples thereof include conventionally known products. Specific examples include natural rubber latex particles, and particles of a synthetic rubber latex (synthetic rubber latex particles) such as styrene-butadiene rubber (SBR), acrylonitrile-butadiene rubber (NBR), and chloroprene rubber (CR). The method of manufacturing the rubber latex particles is not particularly limited. Examples thereof include conventionally known products.

The synthetic resin emulsion particles used as emulsion particles in the tire puncture sealing agent are not particularly limited, and conventionally known synthetic resin emulsion particles may be used. Examples of synthetic resin emulsion particles include urethane emulsion particles, (meth)acrylic emulsion particles, polyolefin emulsion particles, ethylene vinyl acetate emulsion particles (in addition to ethylene vinyl acetate copolymers, including, for example, ethylene vinyl acetate vinyl versatate copolymers), vinyl acetate emulsion particles, and polyvinyl chloride emulsion particles.

One type of emulsion particles may be used alone, or two or more may be used in combination.

Among these, ethylene vinyl acetate emulsion particles, natural rubber latex particles, and SBR latex particles are preferred from the perspective of being inexpensive and easy to obtain. The natural rubber latex particles are not particularly limited. The SBR latex particles are not particularly limited. Examples of each include conventionally known products.

The amount of solid content in the emulsion (including emulsion particles) is not particularly limited. For example, the amount can be from 5 to 50 mass % in the tire puncture sealing agent.

The tire puncture sealing agent used in the tire puncture repair kit of the present invention may further contain an antifreeze agent. Examples of the antifreeze agent contained in the tire puncture sealing agent include ethylene glycol, propylene glycol, and diethylene glycol. One of these may be used alone, or two or more may be used in combination. The antifreeze agent is preferably at least one type selected from the group consisting of ethylene glycol, propylene glycol, and diethylene glycol from the perspective of having an excellent effect of reducing the coagulation point.

From the perspective of excellent performance in preventing freezing of the tire puncture sealing agent, the amount of antifreeze agent is preferably from 100 to 500 parts by mass, more preferably from 120 to 350 parts by mass, and even more preferably from 140 to 300 parts by mass, per 100 parts by mass of solid content of the tire puncture sealing agent.

The tire puncture sealing agent used in the tire puncture repair kit of the present invention preferably further contains a tackifier from the perspective of obtaining excellent sealability. Examples of the tackifier include rosin-based resins such as rosin resins, polymerized rosin resins, rosin ester resins, polymerized rosin ester resins, modified rosins, and the like; terpene phenol resins; terpene resins such as aromatic terpenes and the like; hydrogenated terpene resins (terpene resins to which hydrogen has been added); phenolic resins; xylene resins; and the like.

Furthermore, from the perspective of having excellent miscibility with the emulsion contained in the tire puncture sealing agent, an example of a preferable aspect is one in which an emulsion is obtained by emulsifying these resins. One of these may be used alone, or two or more may be used in combination.

From the perspective of excellent sealability, the amount of solid content of the tackifier is preferably from 50 to 200 parts by mass, more preferably from 70 to 200 parts by mass, and even more preferably from 80 to 180 parts by mass, per 100 parts by mass of the tire puncture sealing agent.

The tire puncture sealing agent, in addition to the above components, can include as desired when necessary, additives such as, for example, anti-aging agents, antioxidants, pigments (dyes), plasticizers, thixotropic agents, UV absorbents, flame retardants, surfactants (including leveling agents), dispersants, dehydrating agents, and antistatic agents.

The method of manufacturing the tire puncture sealing agent used in the tire puncture repair kit of the present invention is not particularly limited. Examples thereof include methods wherein the emulsion particles, and, as necessary, the antifreeze agent, the tackifier, and the additives that may be used, are put in a reaction vessel, and then sufficiently kneaded under reduced pressure using a mixer such as a combination mixer or the like. A commercially available product can be used as the tire puncture sealing agent. An example of a preferable aspect is one in which the tire puncture sealing agent in its entirety is in a state of an emulsion.

In the present invention, the amount of water in the tire puncture sealing agent can be from 20 to 50 mass % of the entire tire puncture sealing agent.

The form of the tire puncture repair kit of the present invention is not particularly limited. For example, the tire puncture sealing agent and the emulsion coagulant may be in the same package (a set).

The tire puncture repair kit of the present invention can be used as a tire puncture emergency repair kit.

EXAMPLES

The present invention is described below in detail using working examples. However, the present invention is not limited to such working examples.

<Evaluation>

The following evaluations were performed using the emulsion coagulants produced as follows. The results are shown in the tables. Note that the arrows in the evaluation result in the tables mean that the evaluation result of gelling time of that sample was the same as the result of sample 24.

Gelling Time 10 g of the emulsion coagulant produced as follows was added to 100 g of puncture repair material (tire puncture sealing agent; puncture repair liquid in the tables), and after mixing, the time (unit: min) until the mixed solution gelled was measured.

Storage Stability

Emulsion coagulants produced as follows were put in containers, and after nitrogen gas replacement, the containers were sealed. After being stored for 6 months at 80° C., storage stability was evaluated. If an emulsion coagulant was in the powdered state and could be easily dispersed in the puncture repair material, it was judged "excellent." If an emulsion coagulant was even partially solidified and did not disperse in the puncture repair material, it was judged "fail."

<Production of Emulsion Coagulants>

Emulsion coagulants were produced by stirring and uniformly mixing the components shown in the tables below in the amounts (parts by mass) shown in the same tables. Note that the arrows in the components in the tables mean that in that sample, the component in that cell was used in the amount pointed to by the arrow.

TABLE 1

| | | Sample no. | | | | | | | |
|---|---|---|---|---|---|---|---|---|---|
| | | 1 Comparative Example | 2 | 3 | 4 | 5 | 6 | 7 | 8 |
| | | | | | Working Example | | | | |
| Magnesium oxide | Reagent | 100 | ← | ← | ← | ← | ← | ← | ← |
| Silane coupling agent | Methacryloxypropyltrimethoxysilane | 0 | 0.5 | 1 | 2 | 4 | 4.5 | 10 | 14 |
| Cellulose | CM cellulose Na (reagent) | 100 | ← | ← | ← | ← | ← | ← | ← |
| Time until gelling after 10 g of emulsion coagulant was added to 100 g of puncture repair liquid (min) | −20° C. | >60 | 60 | 30 | 25 | 25 | 40 | 45 | 45 |
| | 20° C. | >30 | 25 | 15 | 15 | 10 | 15 | 30 | 30 |
| | 70° C. | >30 | 25 | 10 | 10 | 5 | 10 | 20 | 15 |
| Storage stability | 80° C., 6 months | Fail | Fail | Excellent | Excellent | Excellent | Excellent | Excellent | Excellent |

| | | Sample no. | | | | | | | |
|---|---|---|---|---|---|---|---|---|---|
| | | 9 Comparative Example | 10 | 11 | 12 | 13 | 14 | 15 | 16 | 17 Comparative Example |
| | | | | | Working Example | | | | | |
| Magnesium oxide | Reagent | 100 | 0 | 100 | ← | 100 | 100 | 100 | 100 | 100 |
| Silane coupling agent | Methacryloxypropyl-trimethoxysilane | 20 | 2 | 4 | 5 | 3 | 3 | 1.43 | 1.25 | 1.00 |
| Cellulose | CM cellulose Na (reagent) | 100 | 200 | 380 | 380 | 233 | 150 | 42.9 | 25 | 0 |
| Time until gelling after 10 g of emulsion coagulant was added to 100 g of puncture repair liquid (min) | −20° C. | >60 | >60 | 30 | 45 | 30 | 25 | 20 | 45 | >60 |
| | 20° C. | >30 | >30 | 15 | 30 | 15 | 15 | 15 | 30 | >30 |
| | 70° C. | >30 | >30 | 15 | 20 | 10 | 10 | 5 | 30 | >30 |
| Storage stability | 80° C., 6 months | Excellent | Excellent | Excellent | Excellent | Excellent | Excellent | Excellent | Excellent | Excellent |

TABLE 2

| | | Sample no. | | | | | | |
|---|---|---|---|---|---|---|---|---|
| | | 4 | 18 | 19 | 20 | 21 | 22 | 23 |
| | | | | | Working Example | | | |
| Magnesium oxide | Reagent | 100.0 | ← | ← | ← | ← | ← | ← |
| Silane coupling agent | Methacryloxypropyltrimethoxysilane | 2.0 | | | | | | |
| | Methacryloxypropyldimethoxysilane | | 2.0 | | | | | |
| | Methacryloxypropyltriethoxysilane | | | 2.0 | | | | |
| | Methacryloxypropyldiethoxysilane | | | | 2.0 | | | |
| | Methacryloxypropyldipropoxysilane | | | | | 2.0 | | |
| | Tetramethoxysilane | | | | | | 2.0 | |
| | Tetraethoxysilane | | | | | | | 2.0 |
| Alumina | Reagent | | | | | | | |
| Magnesium hydroxide | Reagent | | | | | | | |
| Cellulose | CM cellulose Na (reagent) | 100.0 | ← | ← | ← | ← | ← | ← |
| Time until gelling after 10 g of emulsion coagulant was added to 100 g of puncture repair liquid (min) | −20° C. | 25 | 20 | 25 | 20 | 45 | 20 | 20 |
| | 20° C. | 15 | 15 | 15 | 10 | 30 | 10 | 10 |
| | 70° C. | 10 | 5 | 15 | 5 | 20 | 5 | 5 |
| Storage stability | 80° C., 6 months | Excellent | Excellent | Excellent | Excellent | Excellent | Excellent | Excellent |

TABLE 2-continued

|  |  | Sample no. | | | | | | |
|---|---|---|---|---|---|---|---|---|
|  |  | 24 | 25 | 26 | 27 | 28 | 29 | 30 |
|  |  |  |  |  | Comparative Example | | | |
| Magnesium oxide | Reagent |  |  |  |  |  |  |  |
| Silane coupling agent | Methacryloxypropyltrimethoxysilane | 2 |  |  |  |  |  |  |
|  | Methacryloxypropyldimethoxysilane |  | 2.0 |  |  |  |  |  |
|  | Methacryloxypropyltriethoxysilane |  |  | 2.0 |  |  |  |  |
|  | Methacryloxypropyldiethoxysilane |  |  |  | 2.0 |  |  |  |
|  | Methacryloxypropyldipropoxysilane |  |  |  |  | 2.0 |  |  |
|  | Tetramethoxysilane |  |  |  |  |  | 2.0 |  |
|  | Tetraethoxysilane |  |  |  |  |  |  | 2.0 |
| Alumina | Reagent | 100.0 | ← | ← | ← | ← | ← | ← |
| Magnesium hydroxide | Reagent |  |  |  |  |  |  |  |
| Cellulose | CM cellulose Na (reagent) | 100.0 | ← | ← | ← | ← | ← | ← |
| Time until gelling after 10 g of emulsion coagulant was added to 100 g of puncture repair liquid (min) | −20° C. | >60 | ← | ← | ← | ← | ← | ← |
|  | 20° C. | >30 | ← | ← | ← | ← | ← | ← |
|  | 70° C. | >30 | ← | ← | ← | ← | ← | ← |
| Storage stability | 80° C., 6 months | Excellent | Excellent | Excellent | Excellent | Excellent | Excellent | Excellent |

TABLE 3

|  |  | Sample no. | | | | | | |
|---|---|---|---|---|---|---|---|---|
|  |  | 31 | 32 | 33 | 34 | 35 | 36 | 37 |
|  |  |  |  |  | Working Example | | | |
| Magnesium oxide | Reagent | 100 | ← | ← | ← | ← | ← | ← |
| Silane coupling agent | Methacryloxypropyltrimethoxysilane | 2 |  |  |  |  |  |  |
|  | Methacryloxypropyldimethoxysilane |  | 2.0 |  |  |  |  |  |
|  | Methacryloxypropyltriethoxysilane |  |  | 2.0 |  |  |  |  |
|  | Methacryloxypropyldiethoxysilane |  |  |  | 2.0 |  |  |  |
|  | Methacryloxypropyldipropoxysilane |  |  |  |  | 2.0 |  |  |
|  | Tetramethoxysilane |  |  |  |  |  | 2.0 |  |
|  | Tetraethoxysilane |  |  |  |  |  |  | 2.0 |
| Alumina | Reagent |  |  |  |  |  |  |  |
| Magnesium hydroxide | Reagent | 100.0 | ← | ← | ← | ← | ← | ← |
| Cellulose | CM cellulose Na (reagent) |  |  |  |  |  |  |  |
| Time until gelling after 10 g of emulsion coagulant was added to 100 g of puncture repair liquid (min) | −20° C. | 20 | 25 | 20 | 25 | 45 | 20 | 25 |
|  | 20° C. | 15 | 15 | 15 | 15 | 30 | 10 | 10 |
|  | 70° C. | 15 | 15 | 10 | 10 | 30 | 10 | 10 |
| Storage stability | 80° C., 6 months | Fail | Fail | Fail | Fail | Fail | Fail | Fail |

TABLE 4

|  |  | Sample no. | | | | |
|---|---|---|---|---|---|---|
|  |  | 19 | 38 | 39 | 40 | 41 |
|  |  |  |  | Working Example | | |
| Magnesium oxide | Reagent | 100 | ← | ← | ← | 100 |
| Silane coupling agent | Methacryloxypropyltriethoxysilane | 2 | ← | ← | ← | ← |
| Cellulose | CM cellulose Na (reagent) | 100 |  |  |  |  |
|  | CM cellulose NH4 (reagent) |  | 100 |  |  |  |
|  | Cellulose fiber (reagent) |  |  | 100 |  |  |
|  | Waste paper cellulose (manufactured by Sankyo Seifun) |  |  |  | 100 | 380 |
| Time until gelling after 10 g of emulsion coagulant was added to 100 g of | −20° C. |  | 25 | 20 | 20 | 25 |
|  | 20° C. |  | 15 | 15 | 10 | 10 | 20 |
|  | 70° C. |  | 15 | 10 | 10 | 5 | 10 |

TABLE 4-continued

| | | 42 | 43 | 44 | 45 |
|---|---|---|---|---|---|
| | | | Working Example | | |
| Magnesium oxide | Reagent | 100 | ← | ← | ← |
| Silane coupling agent | Methacryloxypropyltriethoxysilane | 2 | ← | ← | ← |
| Cellulose | CM cellulose Na (reagent) | | | | |
| | CM cellulose NH4 (reagent) | | | | |
| | Cellulose fiber (reagent) | | | | |
| | Waste paper cellulose (manufactured by Sankyo Seifun) | 430 | 150 | 42 | 35 |
| Time until gelling after 10 g of emulsion coagulant was added to 100 g of puncture repair liquid (min) | −20° C. | 40 | 20 | 20 | 45 |
| | 20° C. | 30 | 10 | 10 | 30 |
| | 70° C. | 30 | 5 | 5 | 25 |
| Storage stability | 80° C., 6 months | Excellent | Excellent | Excellent | Excellent |

The details of each of the components shown in Tables 1 to 4 are as follows.

Magnesium oxide: reagent
Methacryloxypropyltrimethoxysilane: trade name KBM-503, manufactured by Shin-Etsu Chemical Co., Ltd.
Methacryloxypropyldimethoxysilane: trade name KBM-502, manufactured by Shin-Etsu Chemical Co., Ltd.
Methacryloxypropyltriethoxysilane: trade name KBE-503, manufactured by Shin-Etsu Chemical Co., Ltd.
Methacryloxypropyldiethoxysilane: trade name KBE-502, manufactured by Shin-Etsu Chemical Co., Ltd.
Methacryloxypropyldipropoxysilane: reagent, manufactured by Wako Pure Chemical Industries, Ltd.
Tetramethoxysilane: reagent, manufactured by Wako Pure Chemical Industries, Ltd.
Tetraethoxysilane: reagent, manufactured by Wako Pure Chemical Industries, Ltd.
CM cellulose Na: carboxymethylcellulose sodium salt, reagent, weight average molecular weight 500,000
CM cellulose NH4: carboxymethylcellulose ammonium salt, reagent, weight average molecular weight 500,000
Cellulose fiber: trade name Super Jet Fiber, manufactured by Nippon Paper Lumber Co., Ltd.
Waste paper cellulose: trade name RNP2, manufactured by Sankyo Seifun Co., Ltd.
Alumina: aluminum oxide, reagent
Magnesium hydroxide: reagent
Tire puncture repair liquid: Contained a synthetic resin emulsion as an emulsion and an antifreeze agent (propylene glycol). The solid content of the emulsion was 25 mass % in the tire puncture repair liquid. The amount of antifreeze agent was prepared at 200 mass % of the solid content of the emulsion.

As is clear from the results shown in Tables 1 to 4, in sample 1, which did not contain a silane coupling agent, sample 9, in which the amount of silane coupling agent exceeded 15 parts by mass per 100 parts by mass of magnesium oxide, samples 10 and 24 to 30, which did not contain magnesium oxide, and sample 17, which did not contain a cellulose, coagulability was low because coagulation took more time than the predetermined time or because it did not coagulate.

In contrast, samples 2 to 8, 11 to 16, 18 to 23, and 31 to 45 had excellent coagulability. Furthermore, these samples had excellent coagulability even when used in a puncture repair liquid containing an antifreeze agent. Therefore, they are thought to exhibit excellent coagulability on puncture repair liquids not containing antifreeze agents as well.

Among them, samples 3 to 5, 11, and 13 to 16, in which the mass ratio of magnesium oxide to silane coupling agent was from 100:1 to 100:4, had better coagulability than samples 2, 6 to 8, and 12.

Furthermore, samples 4, 18 to 20, 22, and 23, in which the silane coupling agent was at least one type selected from the group consisting of a compound having a dimethoxysilyl group, a trimethoxysilyl group, a diethoxysilyl group, a triethoxysilyl group, and a methacryloxy group, tetramethoxysilane, and tetraethoxysilane, had better coagulability than sample 21. The results were the same for samples 31 to 34, 36, and 37 compared to sample 35.

Samples 2 to 8 and 11 to 15, in which the mass ratio of magnesium oxide to cellulose or magnesium hydroxide was from 100:40 to 100:400, had better coagulability than sample 16.

Emulsion coagulability containing a cellulose and having a mass ratio of silane coupling agent to magnesium oxide not less than 1 silane coupling agent to 100 magnesium oxide (samples 3 to 8, 11 to 16, 18 to 23, 38 to 45) had better storage stability than emulsion coagulability containing magnesium hydroxide (samples 31 to 37) and emulsion coagulability having a mass ratio of silane coupling agent to magnesium oxide less than 1 silane coupling agent to 100 magnesium oxide (sample 2).

What is claimed is:

1. A tire puncture repair kit comprising an emulsion coagulant and a tire puncture sealing agent, the emulsion coagulant including magnesium oxide and a silane coupling agent, and at least one selected from the group consisting of a cellulose and magnesium hydroxide, a mass ratio of the magnesium oxide to the silane coupling agent being from 100:0.5 to 100:15.

2. An emulsion coagulant comprising magnesium oxide and a silane coupling agent and at least one selected from the group consisting of a cellulose and magnesium hydroxide, wherein the silane coupling agent is at least one type selected from the group consisting of a compound having a methacryloxy group and at least one type selected from the group consisting of a dimethoxysilyl group, a trimethoxysilyl group, a diethoxysilyl group, and a triethoxysilyl group, tetramethoxysilane, and tetraethoxysilane, a mass ratio of the magnesium oxide to the silane coupling agent being from 100:0.5 to 100:15, wherein a mass ratio of the magnesium oxide to the at least one selected from the group consisting of a cellulose and magnesium hydroxide is from 100:40 to 100:400.

3. The emulsion coagulant according to claim 2, wherein the magnesium oxide and the silane coupling agent and the at least one selected from the group consisting of a cellulose and magnesium hydroxide are packaged in a batch.

4. A tire puncture repair kit comprising the emulsion coagulant described in claim 2 and a tire puncture sealing agent.

* * * * *